United States Patent [19]
Fidler et al.

[11] Patent Number: 5,289,220
[45] Date of Patent: Feb. 22, 1994

[54] DETACHABLE CLOSE-UP LENS ASSEMBLY FOR AN ADJUSTABLE FOCUS LENS CAMERA INCORPORATING A PHOTORANGING SYSTEM

[75] Inventors: Alan Fidler, Chelmsford; Nicholas M. Werthessen, Holliston, both of Mass.

[73] Assignee: Polaroid Corporation, Cambridge, Mass.

[21] Appl. No.: 999,780

[22] Filed: Dec. 28, 1992

[51] Int. Cl.⁵ .......................................... G03B 13/20
[52] U.S. Cl. ..................................... 354/165; 354/295
[58] Field of Search ................. 354/401, 62, 165, 295

[56] References Cited

U.S. PATENT DOCUMENTS

| | | | |
|---|---|---|---|
| D. 279,574 | 1/1985 | Conner et al. | D16/211 |
| 2,379,698 | 7/1945 | Fischer | 354/165 |
| 3,416,426 | 7/1968 | Land | 354/165 |
| 3,882,517 | 5/1975 | Land et al. | 354/295 |
| 4,291,965 | 3/1981 | Johnson et al. | 354/401 |

OTHER PUBLICATIONS

Polaroid Corporation, OEM Product Catalog (1991-1992), "Instant Imaging Systems".

*Primary Examiner*—Michael L. Gellner
*Assistant Examiner*—Howard B. Blankenship
*Attorney, Agent, or Firm*—John J. Kelleher

[57] ABSTRACT

An attachment is mounted on an adjustable focus lens camera which attachment incorporates a second lens system to operate in combination with the camera lens system to allow close-up photography. The attachment further incorporates a ranging system to insure that the subject of the photograph is in proper focus by using converging light beams from said attachment as a focus indicator.

8 Claims, 3 Drawing Sheets

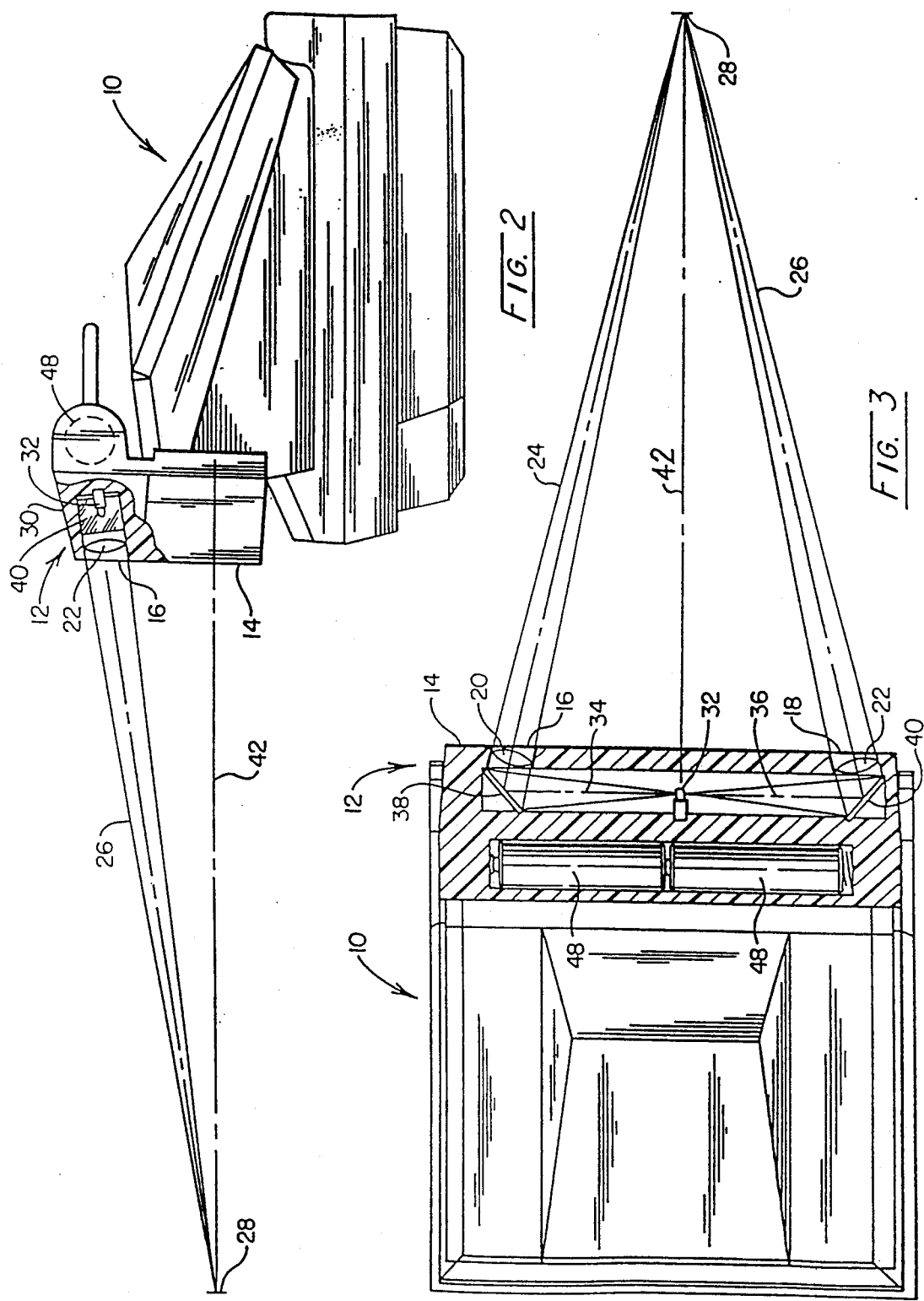

DETACHABLE CLOSE-UP LENS ASSEMBLY FOR AN ADJUSTABLE FOCUS LENS CAMERA INCORPORATING A PHOTORANGING SYSTEM

FIELD OF THE INVENTION

This invention is related to an attachment to a conventional adjustable focus lens camera to allow closeup photography using two complementary lens systems and a ranging device to insure that the subject to be photographed is properly focused.

BACKGROUND OF THE INVENTION

Cameras having the capacity to take close-up photographs are not new. An example is the Acmel Macro Auto V6 camera manufactured by Acmel Corporation of Tokyo, Japan. This particular Acmel camera utilizes a plurality of detachable lens assemblies. Each such lens assembly includes a fixed focus lens that, in conjunction with a fixed focus lens located on the camera body, is capable of focusing an image of a relatively close subject at the camera's film plane, with each detachable lens being designed for single subject distance. Each detachable lens assembly also includes a pair of focusing lights employed in the same manner as in the present invention for the purpose of aiding a camera operator to focus a subject image at the camera's film plane. The resulting camera serves its purpose but is altogether too expensive for consumer-type photography and too complicated for easy use by the non-professional. It is both bulky and heavy, weighing about 4½ pounds.

The use of converging light beams from a camera to determine a proper focal length for the exposure lens is old art as disclosed in U.S. Pat. No. 3,416,426. The theory disclosed therein and in other literature provides a light source reflected from spaced apart mirrors through a lens board to converge at the subject of the photograph. This technique is useful where several parameters remain constant, in particular, one of the constants is flash photography. With flash photography the duration of exposure is set and the only variable is the exposure aperture except of course for the focus of the lens.

The adjustable focus lens Spectra camera sold by Polaroid Corporation of Cambridge, Mass. is an example of where the invention disclosed herein may be incorporated. The Polaroid Corporation presently markets its Spectra camera and a separate attachment for the front thereof, which attachment includes a cover to fit over the subject distance sensing transducer portion of the camera's ultrasonic ranging system. When the ranging system is covered the camera automatically adjusts its focus to a minimum focal position which, in the case of the Spectra camera, is two feet. Focusing the Spectra camera to two feet by this method is one of the features of that particular attachment. Another feature of that attachment is a close-up lens which enables the camera to focus an image of subjects located at a distance of ten (10) inches from the camera. A spring loaded string (ten (10) inches in length) may be pulled from the attachment along a line generally parallel with the axis of the lens system which, in theory, will place the subject in focus. The problem is that the operator must use two hands for the string, attachment and camera in combination and then make sure the camera is not moved after the string is released, before an exposure cycle is initiated. A small deviation of the camera position from the subject as measured by the string will result in a slightly out of focus subject. An appearance design of the adjustable focus lens Spectra camera is shown in U.S. Pat No. De. 279,574 and a focus control system of the type employed in this camera is shown in U.S. Pat. No. 4,291,965.

SUMMARY OF THE INVENTION

This invention is concerned with close-up photography which uses a conventional adjustable focus lens camera combined with an attachment. Together they provide a composite lens system to allow close-up photography without the need for expensive stationary mounted camera and subject. Preferably, the attachment of this invention may be substituted for the above discussed attachment to the Spectra camera.

The attachment of this invention solves the problem of relative movement between an exposure lens and the subject by eliminating the string and substituting a pair of transversely mounted mirrors and lenses in the attachment. Said transversely mounted lenses are permanently focused and oriented to direct beams of light which intersect the axis of the exposure lens system. The two converging light beams may be observed visually at the focus of the exposure lens system. The photographer may simply observe the impinging beams of light from the two transversely mounted mirrors as they impinge on the subject. A single spot of light existing on the subject indicates the subject is in focus through the exposure lens system. Two spots of light indicates the subject is out of focus.

In addition to the focusing light beams or ranging system of this invention, the attachment also includes a second lens system optically aligned with the primary exposure lens system of the camera to provide a focal length which is specific for the combination of the two lens systems. It is not variable; with this invention the combination exposure lens system is always focused at a specific distance.

Objects of the invention not understood from the above and the scope of applicability of the present invention will become apparent from the detailed description to follow taken in conjunction with the accompanying drawings in which like parts are designated by like reference characters.

BRIEF DESCRIPTION OF THE DRAWINGS

FIG. 2 is a side elevational view, partially in section, of the camera and attachment of FIG. 1;

FIG. 3 is a top plan view, partially in section, of the camera and attachment of FIG. 1.

DESCRIPTION OF THE PREFERRED EMBODIMENT

Figure 1:
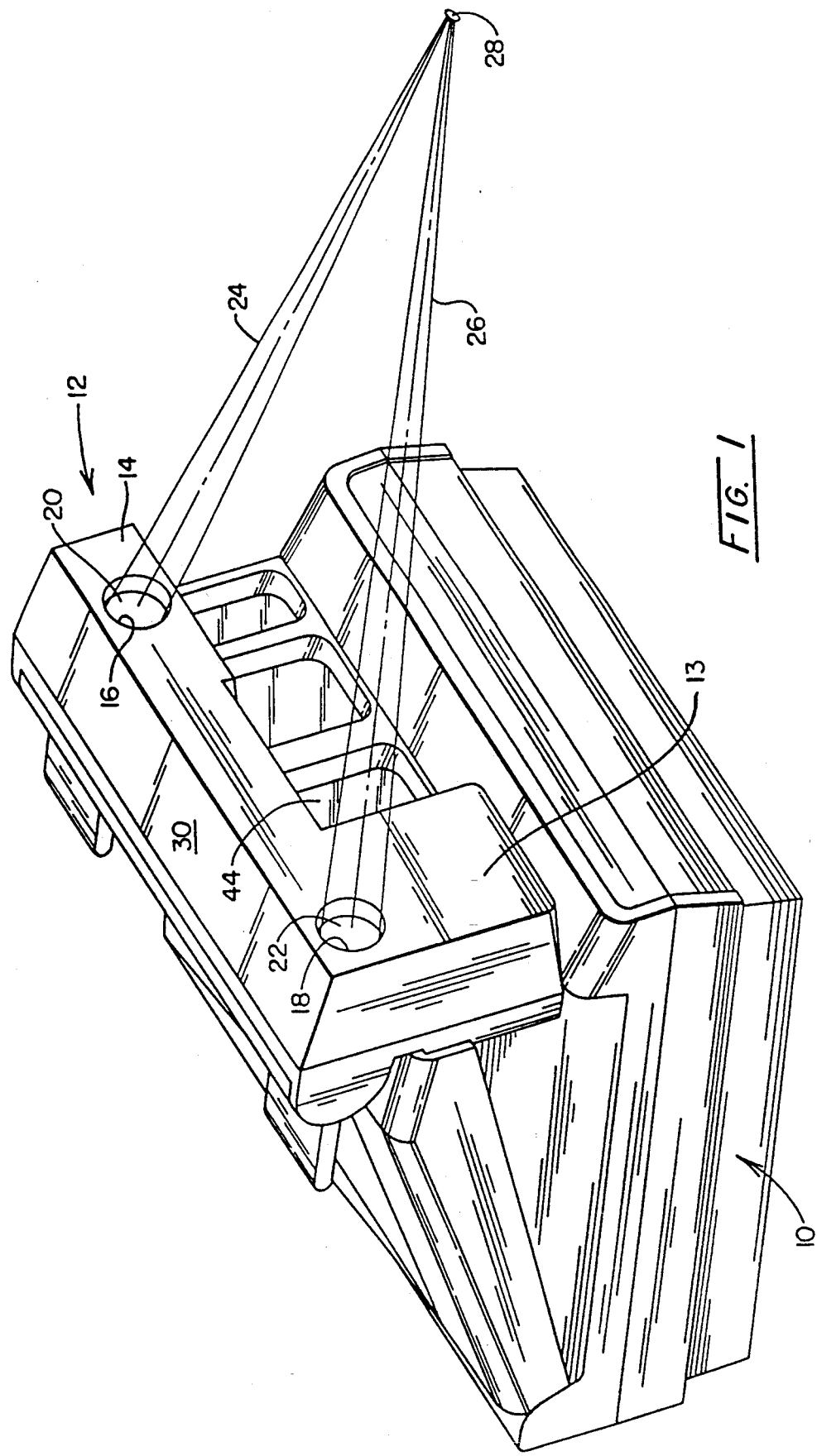
FIG. 1 is a perspective view of a camera with an attachment according to this invention.

FIG. 1 shows an adjustable focus lens camera 10 having an attachment 12 mounted on its front. The camera 10 is capable of focusing images of subjects at its film plane which are located at from two feet to infinity from said camera 10. The camera 10 may include four or more openings in its front including openings for its exposure lens, a viewing aperture, a flash aperture and a transducer which forms a part of the camera 10 ultrasonic ranging system. The camera 10 has an automatic focusing system that is responsive to subject distance signals, created by the ultrasonic ranging system. When mounted on the camera 10 the attachment 12 overlies the transducer of the ultrasonic ranging system which causes the ranging system to believe that it has sensed an extremely close subject and therefore causes the automatic focusing system to focus the adjustable focus lens to its minimum focus position. In the case of the Spectra camera of Polaroid Corporation, that focus position is at two feet.

The invention herein comprises the conventional camera 10 combined with the attachment 12. The particular means for attaching the attachment 12 to the camera body is conventional and need not be described as it does not comprise a part of the inventive concept.

The forward face 14 of attachment 12 includes a pair of spaced apart openings 16, 18 having lenses 20, 22 therein, respectively, which serve to focus ranging light beams 24, 26 on the subject 28 to be photographed.

Figure 4:
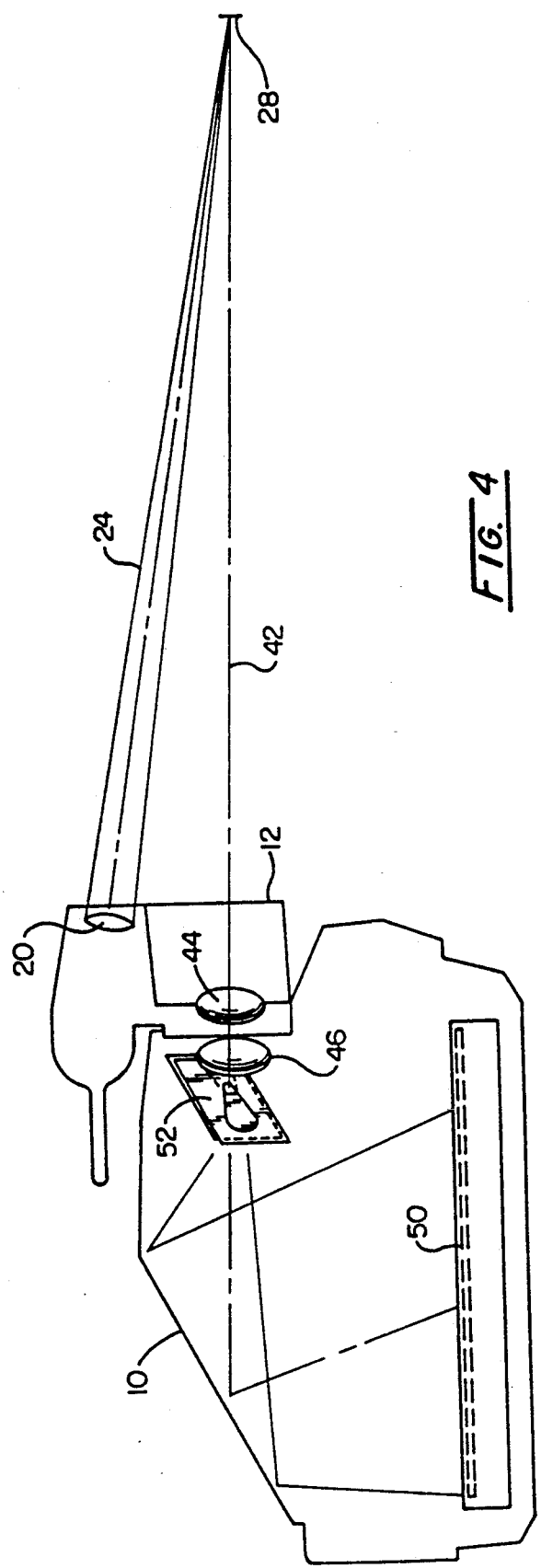
FIG. 4 is a fragmentary diagrammatic view of operative elements of the camera and attachment of this invention.

Looking to FIG. 3, the upper part of attachment 12 immediately below its top surface 30 includes a light source 32. Diverging to each side of light source 32 along paths 34, 36, the light generated impinges on rigid, stationary, transversely mounted mirrors 38, 40. Said mirrors reflect said light from light source 32 at a particular converging angle forwardly of the attachment 12 through lenses 20, 22 at a predetermined fixed angle converging toward the subject 28. The angle of convergence of light beams 24, 26 toward the subject 28 may be the same from either lens 20 or 22 when measured in the horizontal plane illustrated in FIG. 3 or they may be different angles so long as they converge at 28 with the axis 42 of the combined exposure lens system of the camera and the attachment. On the other hand, the angle measured in the vertical plane as illustrated in FIG. 2 is the same between axis 42 and light beams 24 and 26. An observation of FIG. 4 shows that the point 28 of convergence of the light beams 24, 26 also is the point of convergence with a straight line 42 which passes from subject 28 through the center of lens 44 in attachment 12 and adjustable focus lens 46 which is a part of the camera originally provided.

FIG. 3 illustrates a pair of batteries 48 mounted for operable connection to light source 32 for providing the power for light source 32 and ranging light beams 24, 26. A switch (not shown) may be provided to turn light source 32 on and off to minimize a power drain on the batteries 48. Alternatively, the light source 32 may be connected to a battery system in the existing camera if desired.

In operation the camera 10 having attachment 12 mounted on its front has one or more film units 50 mounted therein and shielded from light through lenses 44 and 46 by a conventional blade mechanism or scanning shutter 52 which is closed except for those brief periods in which it is actuated by conventional means (not shown).

In the illustrated embodiment, and merely by way of example, the subject 23 will be in focus at ten inches from lens 46 of the original camera. As indicated earlier, the minimum focus of lens 46 is two feet. Attachment 12 is fitted over the face of the camera with lens 44 in exact alignment with lens 46. The two lenses combined focus at ten inches forward of lens 46.

In order to confirm the proper distance of the subject 28 from lens 46, the attachment 12 includes a range finding device in the form of a pair of converging light beams 24, 26 which are visible to the photographer at the time of taking the picture. Preferably the mirrors 38, 40 combine with lenses 20, 22 to provide a pair of circular beams when viewed in cross-section. As a result, when both beams 24, 26 converge at ten inches forward of lens 46, they form a small circular dot. Movement toward or away from subject 28 causes the beams 24, 26 to show up as an egg shape. Further separation from proper focus causes two circular dots to show up on subject 28, separated transversely from each other. It is only when the combined beams 24, 26 converge to form a single circular spot of light that the subject 28 is in proper focus.

It may be that other shapes would work as well, but circular spots are preferred. Should the beams be square or rectangular, then a slight separation of the points would not show up as clearly. The human eye is a wonderful instrument and capable of distinguishing the most minute deviations from a true circle, and accordingly, can distinguish almost instantaneously when the subject 28 is not in proper focus using this invention.

To sum up, the camera of this invention incorporates two separate exposure lens systems used in combination to provide a camera for use in close-up photography. The first lens system 46 is of the adjustable focus type, is built into the camera body and may be a conventional camera commercially available. The second lens system 44 is a part of an attachment 12 to the camera body and combines with the first lens system to provide a fixed focal length of a shorter distance than the minimum focal length of the first lens system by itself. A pair of mirrors 38, 40 separated transversely from the centerline 42 of the combined lens system 44, 46 are rigidly mounted in the attachment and reflect light beams 34, 36 forwardly as ranging light beams 24, 26. Light beams 24, 26 converge at the focal point 28 of the combined lens system 44, 46 in a circular pattern to allow the photographer to observe the focusing beams on the subject and easily determine whether or not the lens system is properly spaced from the subject for the desired close-up photography. A single point of circular light on the subject to be photographed provides external visual evidence of the proper distance of the combined lens system 44, 46 from the subject 28 withdrawal looking through the camera's viewfinder. Where the two spots of light show up in an egg shaped pattern on the subject, the subject is slightly though acceptably out of focus of the combined lens system.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

We claim:

1. A camera and an attachment in combination incorporating two separate lens systems for close-up photography of a subject comprising:

a camera body supporting a first adjustable focus lens system focused to a particular focal length, said adjustable focus lens system being capable of focusing an image of a subject located within a range of subject distances at the camera's film plane;

a blade mechanism intermediate said first lens system and a film unit mounted in said camera body, actuatable between a light blocking and a light unblocking arrangement so as to open and close a light path between said first lens system and said film unit during an exposure interval;

a second fixed focus lens system mounted in an attachment, said attachment being mounted on said body with said second lens system being located intermediate said first lens system and said subject, said second lens system being optically aligned with said first lens system and having a fixed focal length, said attachment including a ranging system for providing external visual evidence of the proper focal distance of said combined lens systems from said subject, said ranging system including a source of light, means forming paths from said source for conveying light rays from said source to a pair of mirrors, said mirrors being spaced apart from each other and oriented at angles with respect to a straight line extending from said subject through the centers of said first and second lens systems, both said angles being about the same degree as measured in a vertical plane from said straight line; and said angles, light source, light path means and focus of the combined lens systems being configured together to produce two beams of light from said mirrors impinging on said subject to provide a single spot of light on said subject when said subject is in optimum focus and two spots of light on said subject when said subject is not in optimum focus.

2. The camera and attachment of claim 1 wherein said single spot of light is circular.

3. The camera and attachment of claim 2 including light focusing lenses adjacent each of said mirrors to focus light rays from said mirrors on said subject.

4. The camera and attachment of claim 1 including light focusing lenses adjacent each of said mirrors to focus light rays from said mirrors on said subject.

5. The camera and attachment of claim 1 wherein said two spots of light appear in a single egg shaped pattern on said subject when said subject is only slightly spaced from a proper focus location.

6. The camera and attachment of claim 2 wherein said two spots of light appear in a single egg shaped pattern on said subject when said subject is only slightly spaced from a proper focus location.

7. The camera and attachment of claim 3 wherein said two spots of light appear in a single egg shaped pattern on said subject when said subject is only slightly spaced from a proper focus location.

8. The camera and attachment of claim 4 wherein said two spots of light appear in a single egg shaped pattern on said subject when said subject is only slightly spaced from a proper focus location.

* * * * *